United States Patent [19]
Frey

[11] 3,780,822
[45] Dec. 25, 1973

[54] VEHICULAR PARKING BRAKE CONTROL WITH LOCKABLE RELEASE MECHANISM
[75] Inventor: Dennis W. Frey, Morton, Ill.
[73] Assignee: Caterpillar Tractor Co., Peoria, Ill.
[22] Filed: Aug. 21, 1972
[21] Appl. No.: 282,135

[52] U.S. Cl. ........................ 180/114, 74/491, 180/90
[51] Int. Cl. ............................................ B60r 25/08
[58] Field of Search ........................... 74/491, 529; 180/114

[56] References Cited
UNITED STATES PATENTS
3,003,364 10/1961 Hinsey .............................. 74/529 X
3,010,531 11/1961 Flore ................................. 180/114

*Primary Examiner*—Milton Kaufman
*Attorney*—John A. Bucher

[57] ABSTRACT

A vehicular parking brake control and lockable release mechanism to permit securing of a parking brake control lever in an engaged position, including a locking member arranged within a structural enclosure for engagement with the brake lever in its engaged position and a control element for moving the locking member into and out of engagement with the brake lever, the control element being disposed on a in compartment.

2 Claims, 1 Drawing Figure

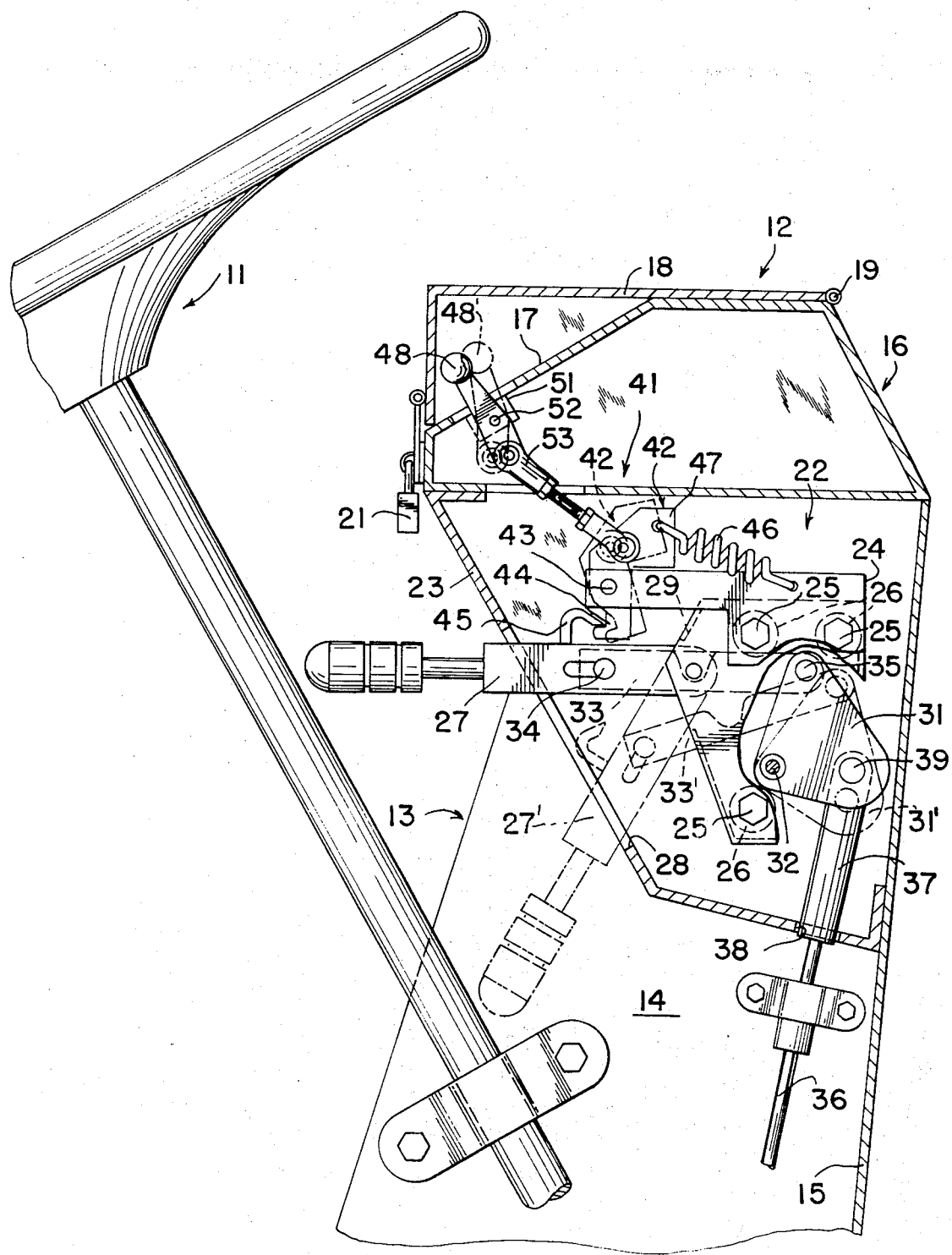

VEHICULAR PARKING BRAKE CONTROL WITH LOCKABLE RELEASE MECHANISM

BACKGROUND OF THE INVENTION

The present invention relates to a vehicular parking brake control and a lockable release mechanism permitting the vehicle operator to secure a parking brake control lever in an engaged position in order to prevent accidental or unauthorized operation of the vehicle.

The parking brake control and lockable release mechanism is particularly adapted for use on vehicles such as earthmoving machines where the operator's station is either open or cannot be readily secured against unauthorized entry. Such vehicles are commonly parked on job sites and are unattended at night and during weekends for example. The present invention provides a means for preventing accidental or unauthorized movement of the vehicle at such times.

SUMMARY OF THE INVENTION

The parking brake control and lockable release mechanism of the present invention comprises a brake lever which is movable between positions corresponding to parking brake engagement and release, a locking member being arranged within a structural enclosure for engagement with the brake lever in its engaged position, a control element for moving the locking member into and out of engagement with the brake lever being arranged within a securable compartment.

Other objects and advantages of the present invention are made apparent in the following description having reference to the accompanying drawing.

BRIEF DESCRIPTION OF THE DRAWING

The single drawing is a fragmentary view of a vehicular operator's station with the parking brake control and lockable release mechanism of the present invention being illustrated as part of a control console in the station.

DETAILED DESCRIPTION OF A PREFERRED EMBODIMENT

An operator's station of the type provided on vehicles such as earthmoving machines is illustrated in the drawing to include a steering assembly 11 and a vehicle control console generally indicated at 12. The control console is arranged within a fabricated structure 13 having a vertical support panel 14 and a transverse forward wall 15.

An instrument and control housing 16, mounted atop the walls 14 and 15, has an inclined dashboard panel 17 providing a mounting surface for various vehicle instruments and controls (not shown) A cover 18 is hinged to the housing 16 as illustrated at 19 so that the cover 18 may be lowered into the position shown in the drawing for securing the panel 17 against unauthorized access. The cover 18 may be locked in the position shown for example by means of a padlock indicated at 21.

A parking brake control assembly, generally indicated at 22, is substantially enclosed by various structural portions of the console described above together with an additional plate 23. The parking brake control assembly includes a support frame 24 secured to the vertical panel 14 by bolts 25 and maintained in spaced apart relation from the panel 14 by cylindrical spacers 26 encircling the bolts 25.

A parking brake control lever 27 extends through an opening 28 in the plate 23 and is pivotally mounted between the frame member 24 and vertical panel 14 by means of a pin 29. A generally triangular plate 31 is also pivotably mounted between the panel 14 and frame 24 by a pin 32. An elongated link 33 is pivotably interconnected between the brake lever 27 and one corner of the triangular plate 31 by means of respective pin connections 34 and 35. The pin connection 34 is disposed upon the lever 27 in such a manner that rotation of the lever 27 about its pin mounting 29 causes pivotal movement of the plate 31 about its mounting 32 in a manner described in greater detail below.

A brake actuating cable 36, conventionally coupled to a vehicular parking brake (not shown) is connected to a cable connector 37 which penetrates an opening 38 in the plate 23. The cable connector 37 is pivotably connected to an opposite corner 39 of the plate 31 so that the plate 31 functions as a bell crank for releasing or engaging the parking brake (not shown) in response to pivotable movement of the lever 27.

Various components of the parking brake control assembly are illustrated in solid lines in the drawing at positions corresponding to brake engagement. These components include the lever 27, link 33 and plate 31. The lever 27 is also illustrated by broken lines at 27' in a downwardly pivoted position corresponding to release of the parking brake. When the lever 27 is pivoted to its position 27', the link 33 and plate 31 are shifted to positions illustrated in broken lines at 33' and 31' respectively.

A locking assembly for the brake lever 27 is generally indicated at 41 and includes an angular plate 42 pivotably mounted between the panel 14 and support frame 24 by means of a pin 43. The angular plate 42 includes a downwardly projecting latch 44. A hook 45 is mounted upon the brake lever 27 for register with the latch 44 when the lever 27 is in its solid line position corresponding to engagement of the brake. A spring 46 is coupled to an opposite end 47 of the angular plate 42 and tends to rotate the plate 42 in a clockwise direction as shown in the FIGURE to cause locking engagement between the latch 44 and the hook 45.

In order to permit the brake lever to be released from this locked condition, a control element such as the lever 48 is arranged upon the panel 17 within the securable compartment provided by the cover 18 and is coupled with the plate 42 to rotate it in a clockwise direction to a release position indicated in broken lines at 42'. To accomplish this purpose, a bracket 51 is secured to the panel 17 and the lever 48 is pivotably mounted upon the bracket 51 by means of a pin 52. The lever 48 is connected with the plate 42 by means of an adjustable link 53.

Through this arrangement, the locking plate 42 always tends to be rotated into locking engagement with the hook 45 by its spring 46 whenever the lever 27 is raised to its solid position corresponding to brake engagement. With the parking brake and locking mechanism in this condition, the parking brake may not be released since the control lever 48 is protected by the cover 18 and the rest of the parking brake control assembly is enclosed within the console structure.

When the cover 18 is removed to permit normal operation of the vehicle, the control lever 48 may be readily moved to its release position indicated in broken lines at 48'. This movement of the lever 48 causes the locking plate 42 to be shifted to its position 42', thus releasing the hook 45 and allowing the brake lever 27 to be rotated to its broken line position 27' for releasing the parking brake.

What is claimed is:

1. A vehicular parking brake control and lockable release mechanism in a vehicular operator station having a control console structure with a compartment capable of being secured by the operator, comprising a brake lever movably mounted on the console structure for movement between positions corresponding to parking brake engagement and release, a locking member arranged with a closed portion of the console structure for mechanical locking engagement with the brake lever in its engaged position, the brake lever projecting out of the closed portion of the console structure through an elongated aperture in the structure to permit manual access to and manipulation of the brake lever, and mechanical means for moving the locking member into and out of engagement with the brake lever, the mechanical means including a control lever disposed in the securable compartment and operatively coupled with the locking member, the mechanical means for moving the locking member also including a spring interconnected between the locking member and console structure, the spring tending to move the locking member into locking engagement with the brake lever, the control lever being operable to release the locking member from engagement with the brake lever.

2. The parking brake control and lockable release mechanism of claim 1 wherein the securable compartment includes a panel for mounting various instruments and controls, the control element being disposed on the panel.

* * * * *